(12) United States Patent
Kiyono et al.

(10) Patent No.: US 6,372,023 B1
(45) Date of Patent: Apr. 16, 2002

(54) METHOD OF SEPARATING AND RECOVERING CARBON DIOXIDE FROM COMBUSTION EXHAUSTED GAS AND APPARATUS THEREFOR

(75) Inventors: Fumio Kiyono, Namiki 4-chome, Tsukuba, Ibaraki-ken (JP), 908-301; Takayuki Saito, Tsukuba (JP)

(73) Assignees: Secretary of Agency of Industrial Science and Technology, Tokyo; Fumio KIYONO, Ibaraki-ken, both of (JP)

( * ) Notice: Subject to any disclaimer, the term of this patent is extended or adjusted under 35 U.S.C. 154(b) by 0 days.

(21) Appl. No.: 09/628,648

(22) Filed: Jul. 28, 2000

(30) Foreign Application Priority Data

Jul. 29, 1999 (JP) .............................. 11-215795

(51) Int. Cl.$^7$ ............................... B01D 47/06
(52) U.S. Cl. ......................... 95/228; 62/632; 45/236; 96/266; 96/322; 422/173; 422/202; 423/220
(58) Field of Search ................. 95/228, 229, 236; 96/322, 266; 62/617, 625, 632; 423/220, 437 R; 422/173, 198, 202, 204

(56) References Cited

U.S. PATENT DOCUMENTS

| | | | | |
|---|---|---|---|---|
| 5,364,611 A | * | 11/1994 | Iijima et al. |
| 5,397,553 A | * | 3/1995 | Spencer |
| 5,434,330 A | | 7/1995 | Hnatow et al. |
| 5,473,904 A | * | 12/1995 | Guo et al. |
| 5,562,891 A | * | 10/1996 | Spencer et al. |
| 5,660,603 A | * | 8/1997 | Elliot et al. |
| 5,700,311 A | * | 12/1997 | Spencer |
| 6,028,234 A | * | 2/2000 | Heinemann et al. |
| 6,090,186 A | * | 7/2000 | Spencer |
| 6,106,595 A | * | 8/2000 | Spencer |
| 6,235,091 B1 | * | 5/2001 | Spencer |

FOREIGN PATENT DOCUMENTS

| | | |
|---|---|---|
| EP | 0545296 A1 | 9/1993 |
| JP | 06205937 | 7/1994 |

OTHER PUBLICATIONS

Resource and Environment, vol. 9, No. 1, pp. 79–86 (2000).
Japanese J. Multiphase Flow, vol. 13, No. 4, pp. 364–371 (1999).
Division of Fuel Chemistry, American Chemical Society, Preprints of symposia, vol. 45, No. 4, pp. 671–675, 200th ACS National Meeting, Aug. 20–24, 2000.

* cited by examiner

Primary Examiner—Duane S. Smith
(74) Attorney, Agent, or Firm—Birch, Stewart, Kolasch & Birch, LLP

(57) ABSTRACT

There is disclosed a method of separating and recovering carbon dioxide from combustion exhausted gas, which method includes: bringing the combustion exhausted gas in contact with water, under a pressure-increased condition, to form carbon dioxide hydrate; and thus separating and recovering carbon dioxide contained in the combustion exhausted gas. According to the method, $CO_2$ of high purity can be separated and recovered from the combustion exhausted gas at low cost and with low energy consumption. There is also disclosed an apparatus for separation and recovery of $CO_2$ which apparatus is employed in the method.

9 Claims, 4 Drawing Sheets

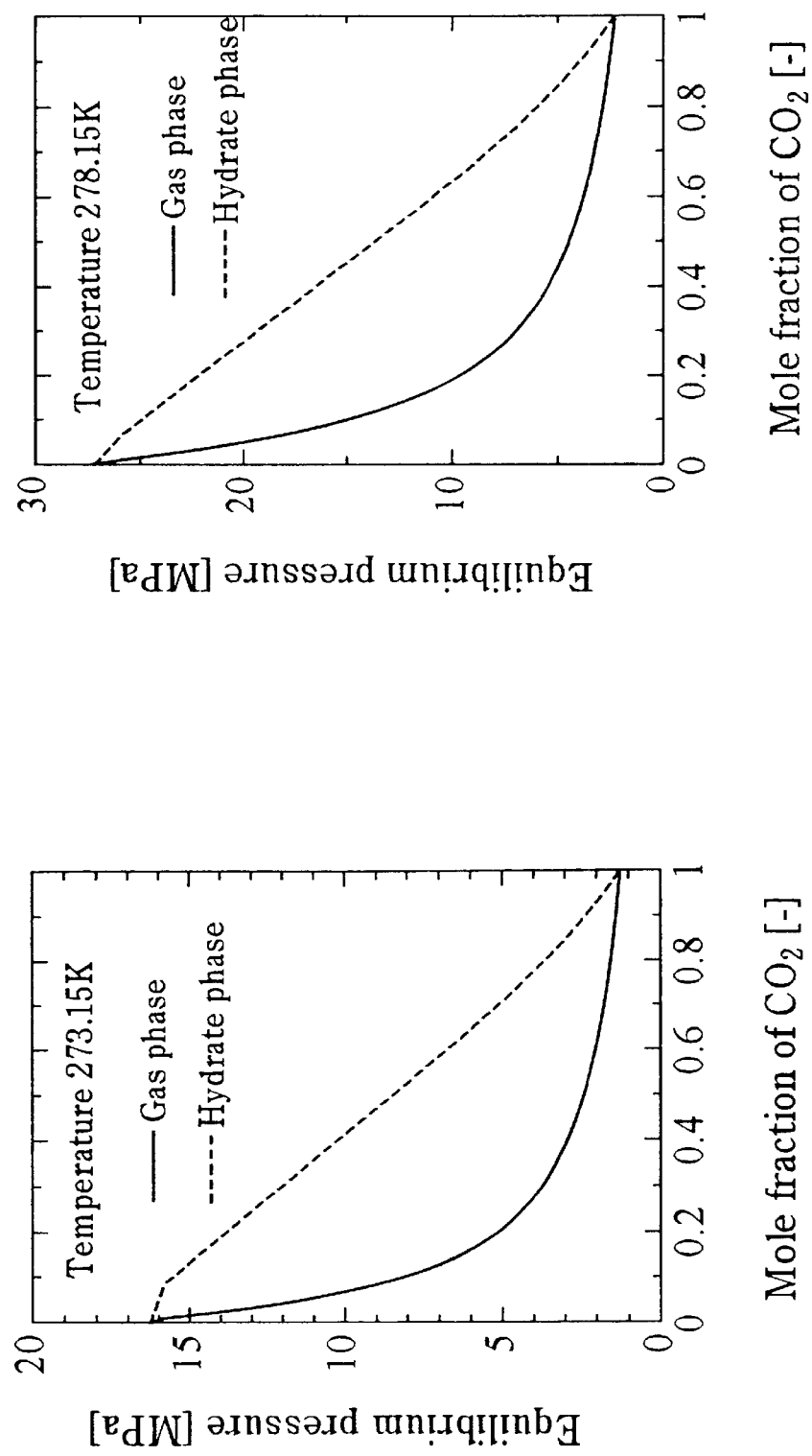
Fig. 4(A) Phase equilibrium for $CO_2$-$N_2$-$O_2$ mixture hydrate where $N_2$:$O_2$ is constant at 97.7:2.3
Fig. 4(B) Phase equilibrium for $CO_2$-$N_2$-$O_2$ mixture hydrate where $N_2$:$O_2$ is constant at 97.7:2.3

METHOD OF SEPARATING AND RECOVERING CARBON DIOXIDE FROM COMBUSTION EXHAUSTED GAS AND APPARATUS THEREFOR

FIELD OF THE INVENTION

The present invention relates to a method of separating and recovering carbon dioxide from a combustion exhausted gas emitted from thermoelectric power plants, boilers in factories, blast furnaces of iron mills, incinerators, and the like. More specifically, the present invention relates to a method of separating and recovering carbon dioxide from a combustion exhausted gas, by bringing the combustion exhausted gas into contact with water, and then separating and recovering carbon dioxide contained in the combustion exhausted gas as solid carbon dioxide hydrate. Further, the present invention relates to an apparatus for use in the above separation and recovery of carbon dioxide.

BACKGROUND OF THE INVENTION

Several methods of separating and recovering carbon dioxide from combustion exhausted gas have been developed in view of protection of the global environment and the like. Such conventional methods include, for example, the chemical absorption method, the physical adsorption method, the film separation method, and the like. In the chemical absorption method, carbon dioxide is separated and recovered by utilizing characteristics of an amine absorption solution, which absorbs carbon dioxide at a temperature range of 40 to 50° C. and releases it at a temperature range of 100 to 120° C. In the physical adsorption method, carbon dioxide is separated and recovered by utilizing characteristics of zeolite, which adsorbs carbon dioxide at an increased pressure and desorbs it at a decreased pressure. Further, in the film separation method, carbon dioxide is film-separated by using a film made of porous hollow threads.

However, when carbon dioxide is separated and recovered by using the chemical absorption or physical adsorption methods, an extremely large amount of energy is required. For example, when carbon dioxide emitted from a thermoelectric power plant is recovered according to the chemical absorption method, the amount of energy required for the $CO_2$ recovery according to the method will reach 27% of the electric power generated in the plant. Similarly, when carbon dioxide emitted from a thermoelectric power plant is recovered according to the physical adsorption method, the amount of energy required for the $CO_2$ recovery according to the method will reach 40% of the electric power generated in the plant. The main reason such an large amount of energy has to be consumed is that the temperature/pressure difference between the $CO_2$ absorption/adsorption condition and the $CO_2$ release/desorption condition is very large. Accordingly, a tremendously large amount of energy is lost while absorption/release of carbon dioxide is repeated by using amines or zeolite. On the other hand, in the film separation method, in which $CO_2$ is separated based on its molecular size, there arises a problem that $N_2$ molecules and $CO_2$ molecules contained in combustion exhausted gas are hardly separated, as the sizes of $N_2$ molecules and $CO_2$ molecules are approximately equal, resulting in low purity of the recovered $CO_2$.

SUMMARY OF THE INVENTION

The present invention is directed to overcome the aforementioned defects in the conventional methods of separating $CO_2$ from combustion exhausted gas. Specifically, an object of the present invention is to provide a method of separating and recovering $CO_2$ from combustion exhausted gas, which method allows recovery of $CO_2$ of high purity at low cost and low energy consumption. Another object of the present invention is to provide an apparatus that is used in the above-described method of separating and recovering $CO_2$.

Other and further objects, features, and advantages of the invention will appear more fully from the following description, take in connection with the accompanying drawings.

BRIEF DESCRIPTION OF THE DRAWINGS

FIG. 4(A) and FIG. 4(B) are diagrams on phase equilibrium for a $CO_2$-$N_2$-$O_2$ mixture gas (combustion exhausted gas), which show the mole fraction of $CO_2$ with a gas phase line and a hydrate line.

DETAILED DESCRIPTION OF THE INVENTION

Figure 1:
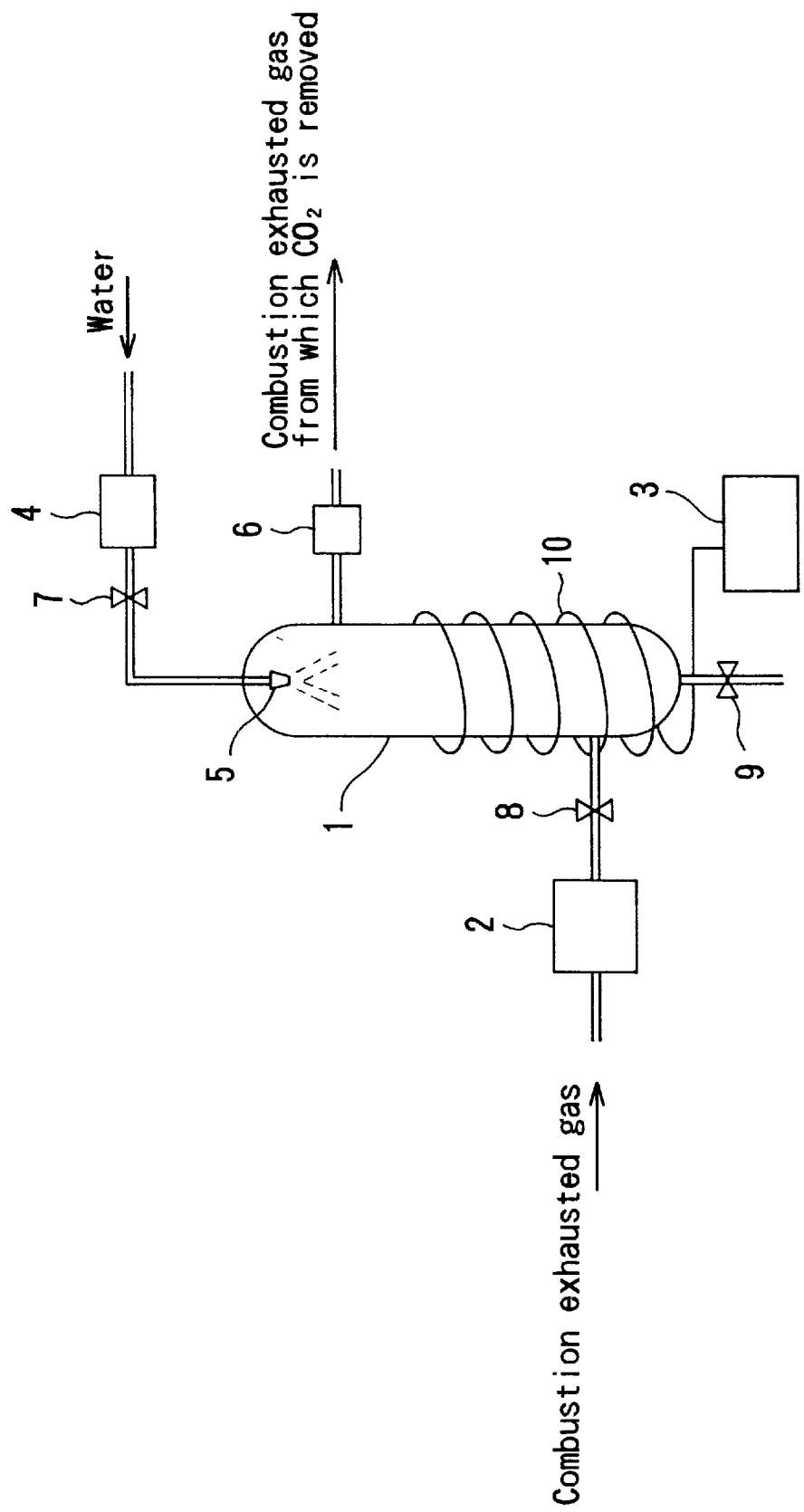
FIG. 1 is an explanatory view showing an embodiment of the apparatus of the present invention.

As a result of assiduous study in view of the aforementioned problems in conventional methods, the inventors of the present invention found that carbon dioxide can be separated and recovered by bringing combustion exhausted gas into contact with water and thereby forming solid carbon dioxide hydrate from $CO_2$ contained in the combustion exhausted gas and the water. The present invention has been made based on this finding.

That is, according to the present invention, there is provided:

(1) A method of separating and recovering carbon dioxide from a combustion exhausted gas, comprising: bringing the combustion exhausted gas into contact with water, under a pressure-increased condition, to form carbon dioxide hydrate; and thereby separating and recovering carbon dioxide contained in the combustion exhausted gas;

(2) The method of separating and recovering carbon dioxide from a combustion exhausted gas as stated in the above (1), comprising spraying the water as fine particles, to bring the combustion exhausted gas into contact with the water;

(3) The method of separating and recovering carbon dioxide from a combustion exhaust gas as stated in the above (1), comprising bringing the combustion exhausted gas into contact with a carrier carrying water thereon;

(4) The method of separating and recovering carbon dioxide from a combustion exhausted gas as stated in the above (1), comprising blowing the combustion exhausted gas into the water, to bring the combustion exhausted gas into contact with the water;

(5) The method of separating and recovering carbon dioxide from a combustion exhausted gas as stated in any one of the above (1) to (4), wherein the water contains a water-soluble organic compound;

(6) An apparatus for separation and recovery of carbon dioxide from a combustion exhausted gas, which comprises: a reactor that has an inlet of the combustion exhausted gas and an outlet of the combustion exhausted gas from which carbon dioxide is removed, and that is capable of controlling and maintaining the inner pressure and temperature thereof, wherein, in the reactor, the combustion exhausted gas containing carbon dioxide is brought into contact with water, to precipitate carbon dioxide hydrate, and thereby carbon dioxide contained in the combustion exhausted gas is separated and recovered;

(7) The apparatus for separation and recovery of carbon dioxide from a combustion exhausted gas as stated in the above (6), which comprises means for spraying water inside the reactor;

(8) The apparatus for separation and recovery of carbon dioxide from a combustion exhausted gas as stated in the above (6), which comprises a carrier provided inside the reactor for carrying water thereon; and (9) The apparatus for separation and recovery of carbon dioxide from a combustion exhausted gas as stated in any one of the above (6) to (8), wherein the water contains a water-soluble organic compound.

Carbon dioxide hydrate is an ice-like crystal in which water molecules and $CO_2$ molecules as guest molecules are bonded with each other at a high pressure-low temperature environment. Carbon dioxide hydrate has a specific structure in which a guest molecule(s) is surrounded and present inside "a cage" formed by water molecules.

In general, the main components of combustion exhausted gas after being treated in a denitration device and a desulferization device are carbon dioxide, oxygen, nitrogen and water. A very small amount of nitrogen oxides and sulfur oxides may also be found in such a gas. Among the hydrate products which could be made from the main components of the combustion exhausted gas, carbon dioxide hydrate can be produced at the lowest pressure and at the highest temperature, as compared with other products. Accordingly, when a combustion exhausted gas and water are brought into contact with each other and pressurized and cooled, $CO_2$ precipitates, as a hydrate, most quickly (i.e. at the lowest pressure and the highest temperature) among the main components of combustion exhausted gas. In such a condition in which pressure is still quite low and the temperature is still quite high, the main components other than $CO_2$ of the combustion exhausted gas hardly precipitate as a hydrate. With respect to each main component of combustion exhausted gas, the temperature/pressure conditions required to form a hydrate thereof is as follows. When the temperature is set at 5° C., the pressure required to form a hydrate of $CO_2$, $O_2$, and $N_2$ is each, in that order, 2.5 MPa or higher, 21.1 MPa or higher, and 25.5 MPa or higher. On the other hand, when the pressure is set at 3 MPa, a hydrate of $CO_2$ can be formed at 6° C., but hydrates of $O_2$ and $N_2$ cannot be formed at 0° C. or at a temperature even lower than 0° C.

Such a difference in hydrate formation between $CO_2$ and $N_2$ or $O_2$ can be explained on the bases of the difference of the potential function between the guest molecule and the cage-like water molecules. That is, in a function potential curve for the guest molecule (not shown), the depth of the potential well with carbon dioxide is much deeper than that of nitrogen and oxygen. Accordingly, it is assumed that the carbon dioxide molecule is selectively captured in the hydrate cage.

In the present invention, in order to design the separation process for the mixture of carbon dioxide, oxygen and nitrogen, the phase equilibrium diagram for $CO_2$-$N_2$-$O_2$ mixture is useful. After removing NOx and SOx, main components of combustion exhausted gas are nitrogen, carbon dioxide, oxygen and water. Hydrate phase equilibrium calculation was carried out for the exhausted gas of these components. FIGS. 4(A) and 4(B) demonstrate results of the phase equilibrium calculation made by the inventors based upon the van der Waals and Platteeuw theory. If the molar fraction of carbon dioxide in the exhausted gas is, for example, 0.12 to 0.2, carbon dioxide can be almost separated and recovered by two steps of forming and dissolving carbon dioxide hydrates.

In the present invention, the conditions required to form carbon dioxide hydrate may differ depending on the gas composition such as the concentration of $CO_2$ in the combustion exhausted gas. For example, by setting temperature/pressure conditions at −10° C. and 0.9 MPa or more, at 0° C. and 1.3 MPa or more, or at 5° C. and 2.5 Mpa or more, carbon dioxide hydrate is exclusively produced and production of hydrates of any other components in the exhausted gas can be prevented.

In the present invention, when temperature and pressure conditions satisfy those required for producing carbon dioxide hydrate, by bringing combustion exhausted gas into contact with water, $CO_2$ contained in the combustion exhausted gas is bonded with water, to precipitate as solid carbon dioxide hydrate. Other components of the combustion exhausted gas remain unchanged in the combustion exhausted gas. Accordingly, $CO_2$ is separated from the combustion exhausted gas and recovered as solid carbon dioxide hydrate. The solid carbon dioxide hydrate which has been recovered from the combustion exhausted gas is then subjected to a pressure-reducing or temperature-increasing treatment, such that $CO_2$ is released from water and recovered as $CO_2$ itself.

When combustion exhausted gas is brought into contact with water, water may be sprayed in a form of a numerous number of fine particles toward the combustion exhausted gas. Alternatively, the combustion exhausted gas may be brought into contact with water by way of a carrier carrying water thereon. Further alternatively, the combustion exhausted gas may be brought into contact with water by blowing the combustion exhausted gas into water so as to form very small bubbles of the combustion exhausted gas in the water.

Water to be brought into contact with combustion exhausted gas in the present invention may contain, according to necessity, a water-soluble organic compound. Such a water-soluble organic compound contained in water has a function of shifting the temperature required to form a hydrate to a higher temperature side and also shifting the pressure required to form a hydrate to a lower pressure side. Accordingly, the amount of energy required to form a hydrate can be hugely reduced. Examples of the water-soluble organic compound having such a function include cyclopentanol, cyclopentanone, tetrahydrofuran, furan, γ-butylolactone, 1,4-dioxane, acetone, 1,3-dioxolane, and the like.

Next, an apparatus which is preferable to carry out the method of the present invention will be described, with reference to the attached drawings.

FIG. 1 is an explanatory view showing an embodiment of an apparatus of the present invention. In the apparatus shown in FIG. 1, combustion exhausted gas is supplied to a reactor (reaction tower) 1 by way of a pressurizing device 2. The combustion exhausted gas is pressurized until the inner pressure in the reactor 1 reaches the pressure required to form carbon dioxide hydrate. At the same time, the combustion exhausted gas inside the reactor 1 is cooled by a cooling pipe 10 and a cooling device 3, as means for controlling temperature, until the temperature of the combustion exhausted gas inside the reactor 1 reaches the temperature required to form carbon dioxide hydrate. Thereafter, water is pressurized by a pressurizing pump 4 and the pressurized water is supplied to a nozzle 5 which is means for spraying water in a form of fine particles inside the reactor 1. Water is sprayed in a form of a numerous number of water fine particles toward the combustion exhausted gas inside the reactor 1, so that the water is brought into contact with the combustion exhausted gas. As a result, $CO_2$ contained in the combustion exhausted gas is bonded with water, they precipitate as solid carbon dioxide hydrate and accumulate in the reactor 1. The combustion exhausted gas from which $CO_2$ has been removed is continuously emitted from the reactor 1 through a pressure adjusting valve 6.

In the apparatus of FIG. 1, a check valve 7 is provided between the nozzle 5 and the pressurizing pump 4. A plurality of nozzles may be provided as the nozzle (5). Providing a plurality of nozzles is advantageous because a large number of water fine particles can be formed and spayed at a time and therefore the efficiency of separating $CO_2$ is enhanced. The nozzle may be provided at the upper portion of the reactor (1) so that water is sprayed from the upper portion of the reactor. Alternatively, the nozzle may be provided at the side portion of the reactor so that water is sprayed from the side portion of the reactor. The number and arrangement of the nozzle(s) inside the reactor may be determined appropriately, in accordance with the size, shape and other factors of the reactor.

In the present invention, when combustion exhausted gas is brought into contact with water by spraying the water to the gas, it is preferable that water is sprayed in a form of a numerous number of fine particles having a diameter which is in approximately the same order as that of a hydrate film (preferably 1 to 3 $\mu$m). By spraying water in such a manner, carbon dioxide can be efficiently removed without carrying out stirring inside the reactor.

The cooling pipe 10 of the cooling device 3 is provided such that the cooling pipe 10 is wound around the external surface of the reactor 1. That is, the cooling pipe 10 cools down the combustion exhausted gas in the reactor 1 by cooling the reactor itself. The cooling pipe 10 may be provided inside the reactor 1. With respect to the temperature controlling means, there is no particular limitation of the type and any known devices may be employed as long as the devices are capable of maintaining the temperature of the mixed gas in the reactor at the temperature required to form the desired hydrate.

Figure 2:
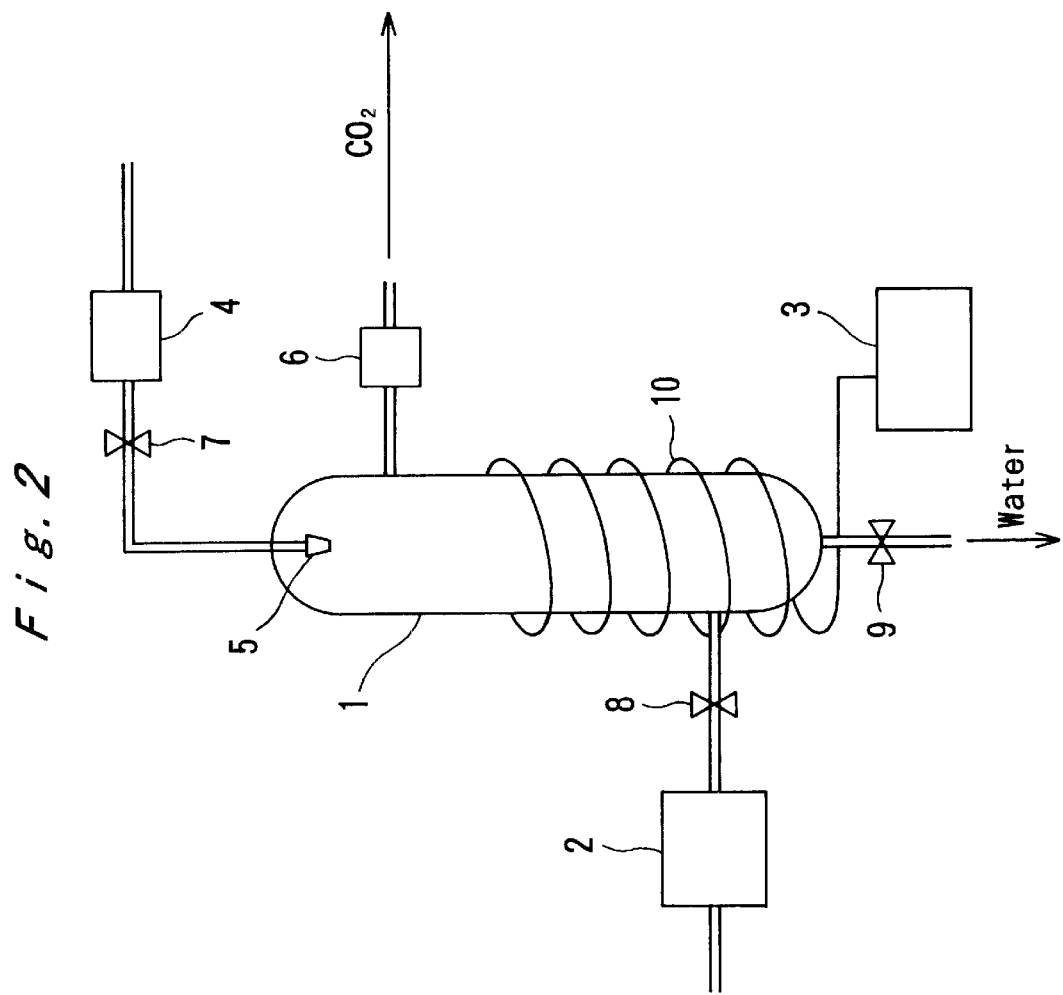
FIG. 2 is an explanatory view showing how to recover $CO_2$ in the apparatus of FIG. 1.

FIG. 2 is an explanatory view which shows how to recover $CO_2$ from the reactor 1 after the apparatus shown in FIG. 1 has been operated as described above. When $CO_2$ is to be recovered, the valve 8 is closed and the pressure in the reactor 1 is reduced to the pressure at which dissociation of carbon dioxide hydrate occurs (e.g. less than 2.5 MPa at 5° C.), or the cooling of the reactor is stopped so that the temperature is allowed to rise up to the temperature at which dissociation of carbon dioxide hydrate occurs (e.g. higher than 5° C. when the pressure is 2.5 MPa). Solid carbon dioxide hydrate accumulated in the reactor 1 is then decomposed to water and $CO_2$. $CO_2$ generated by the decomposition of carbon dioxide hydrate is continuously emitted from the reactor 1 via the pressure control valve 6 and recovered. Water can be recovered by opening the valve 9.

Figure 3:
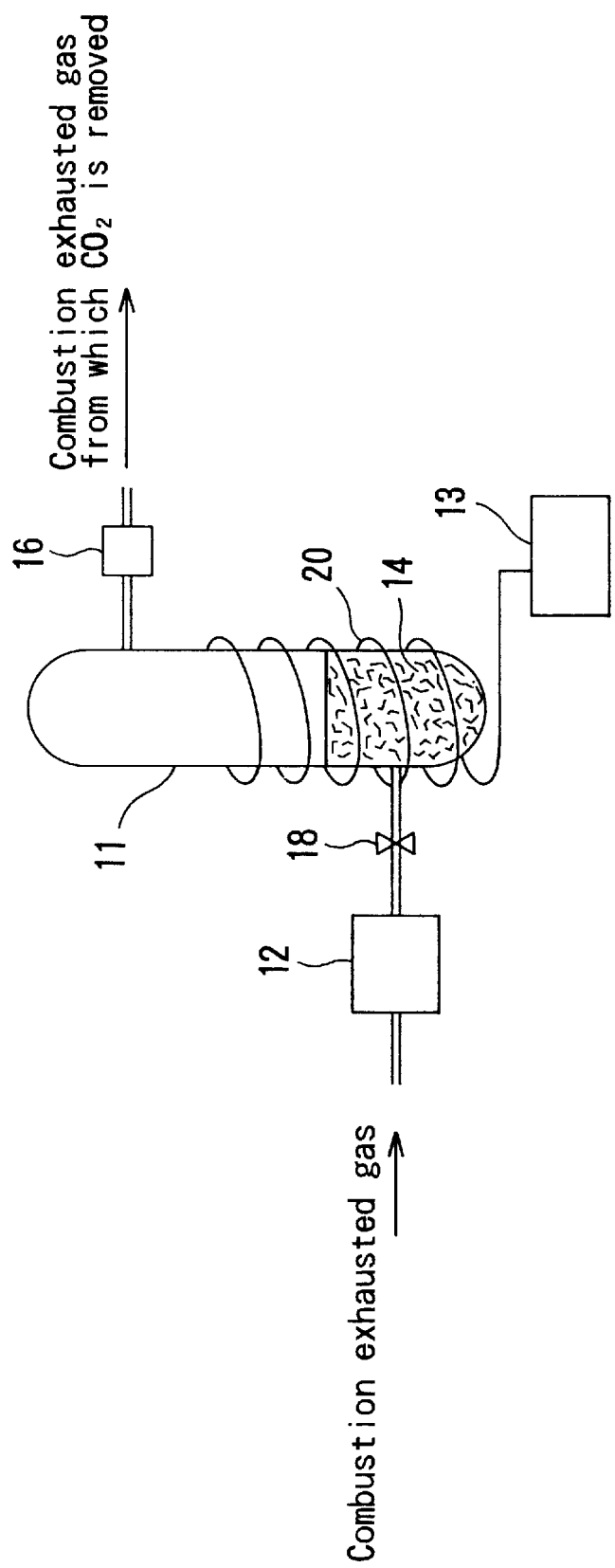
FIG. 3 is an explanatory view showing another embodiment of the apparatus of the present invention.

FIG. 3 shows another embodiment of the apparatus of the present invention. The apparatus has a reactor 11, a pressurizing device 12, a cooling device 13, a pressure controlling valve 16, a valve 18 and a cooling pipe 20, in FIG. 3. A carrier 14 carrying water thereon is charged in the reactor 11. In the present invention, as the carrier carrying water thereon, a cascade mini-ring, Raschig ring, and the like can be used, for example.

In the apparatus of FIG. 3, combustion exhausted gas is supplied to the reactor 11 by way of the pressurizing device 12. The combustion exhausted gas is pressurized until the inner pressure in the reactor 11 reaches the pressure required to form carbon dioxide hydrate. At the same time, the combustion exhausted gas inside the reactor 11 is cooled by the cooling device 13 and a cooling pipe 20. As a result, $CO_2$ contained in the combustion exhausted gas is bonded with water which is carried on the carrier 14 and they precipitate as carbon dioxide hydrate. The combustion exhausted gas from which $CO_2$ has been removed is emitted from the reactor 11 through the pressure adjusting valve 16.

$CO_2$ which has precipitated as a hydrate is recovered, as described with reference to FIG. 2. By closing the valve 18 and reducing the pressure in the reactor to the pressure at which dissociation of carbon dioxide hydrate occurs or by increasing the temperature in the reactor to the temperature at which dissociation of carbon dioxide hydrate occurs, carbon dioxide hydrate which has precipitated is decomposed to water and $CO_2$. $CO_2$ is emitted and recovered via the pressure adjusting valve 16. On the other hand, water may be carried on the carrier 14 again.

In the apparatus of the present invention shown in FIG. 1, water is brought into contact with combustion exhausted gas by spraying water in the reactor. In the apparatus of the present invention shown in FIG. 3, water is brought into contact with combustion exhausted gas by providing a carrier carrying water thereon in the reactor. However, the apparatus of the present invention is not limited to these examples and may have any suitable structure. For example, combustion exhausted gas may be blown into water charged in a reactor such that fine bubbles of the combustion exhausted gas are formed in the water and the gas is brought into contact with water in a form of these bubbles.

Further, in the apparatus of the present invention, size and shape of the reactor (and other factors, as well) are not particularly limited, as long as the temperature and pressure inside the reactor can be adjusted to those required for formation of carbon dioxide hydrate or to those required for dissociation of formed carbon dioxide hydrate and as long as water and combustion exhausted gas are brought into contact with each other efficiently.

Although not shown in FIGS. 1 to 3, the apparatus of the present invention has means for measuring or displaying the temperature and pressure inside the reactor, so that the temperature and pressure inside the reactor are controlled adequately in forming carbon dioxide hydrate. The devices that can be used as means for measuring or displaying the temperature or pressure in the reactor may be those generally used for such purposes, and not particularly limited.

As described above, amine is necessary in the chemical absorption method as an absorption solution, and zeolite is necessary in the physical adsorption method as an adsorbent. On the other hand, the method and the apparatus of the present invention of separating and recovering $CO_2$ from combustion exhausted gas utilizes water and thus allows separation and recovery of $CO_2$ at significantly low cost, as well as with clean means.

In addition, it should be noted that the difference between the temperature required for forming carbon dioxide hydrate and the temperature at which dissociation of carbon dioxide hydrate occurs is approximately 5° C. Accordingly, by using the method and the apparatus of the present invention of separating and recovering $CO_2$ from combustion exhausted gas, absorption/release of $CO_2$ can be repeated as desired with a quite small amount of energy, thereby effecting separation and recovery of $CO_2$ with significantly low energy consumption.

Further, as the conditions required for forming carbon dioxide hydrate largely differ from those for forming oxygen hydrate, nitrogen hydrate and the like, the combustion exhausted gas components other than $CO_2$ are not likely to be present in the produced carbon dioxide hydrate. Therefore, the present invention has an excellent effect of recovering $CO_2$ of very high purity from combustion exhausted gas.

The present invention is described in more detail with reference to the following example, but the invention is not limited to that.

EXAMPLE

The apparatus shown in FIGS. 1 and 2 was utilized. The high-pressure vessel (1) was made by SUSF304 and its diameter was 150 mm. The molar fraction of combustion exhausted gas, a mixture gas of $CO_2$, $O_2$, $N_2$ and $H_2O$ was controlled by mass flow controllers. The exhausted gas was pressurized by a booster pump (2) then introduced to the vessel (1). Carbon dioxide hydrate was made by the spray method as described in the above. Pressurized water was jetted out from the nozzle (5). Temperature was measured by platinum resistance thermometers (not shown) and pressure was gauged by a pressure transducer (not shown). The molar fraction of the gas components in the combustion exhausted gas and in the hydrates was measured by a gas chromatograph. The results are shown in Table 1.

TABLE 1

| Temperature: 276.75 K | | Pressure: 9.33 MPa | |
| --- | --- | --- | --- |
| | $N_2$ | $O_2$ | $CO_2$ |
| Injection port values set by the control of MFC | 50.0% | 20.0% | 30.0% |
| Measured values of gas component before injection | 51.1% | 21.1% | 27.9% |
| Measured values of gas component in hydrates | 41.8% | 19.1% | 39.1% |

As is apparent from the results in Table 1, the molar fraction of carbon dioxide in the hydrate phase was remarkably higher than that in the gas phase. In this connection, it is noted that the obtained results of $CO_2$ recovery were lower than a calculated value. One of the reasons is that some of $CO_2$ might be lost while the dissociation of the obtained $CO_2$ hydrate before measurement.

Having described our invention as related to the present embodiments, it is our intention that the invention not be limited by any of the details of the description, unless otherwise specified, but rather be construed broadly within its spirit and scope as set out in the accompanying claims.

What we claim is:

1. A method of separating and recovering carbon dioxide from a combustion exhausted gas, comprising: bringing the combustion exhausted gas into contact with water, under a pressure-increased condition, to form carbon dioxide hydrate, and thereby separating and recovering carbon dioxide contained in the combustion exhausted gas.

2. The method of separating and recovering carbon dioxide from a combustion exhausted gas as claimed in claim 1, comprising spraying the water as fine particles, to bring the combustion exhausted gas into contact with the water.

3. The method of separating and recovering carbon dioxide from a combustion exhausted gas as claimed in claim 1, comprising bringing the combustion exhausted gas into contact with a carrier carrying the water thereon.

4. The method of separating and recovering carbon dioxide from a combustion exhausted gas as claimed in claim 1, comprising blowing the combustion exhausted gas into the water, to bring the combustion exhausted gas into contact with the water.

5. The method of separating and recovering carbon dioxide from a combustion exhausted gas as claimed in claim 1, wherein the water contains a water-soluble organic compound.

6. An apparatus for separation and recovery of carbon dioxide from a combustion exhausted gas, which comprises:
a reactor that has an inlet of the combustion exhausted gas and an outlet of the combustion exhausted gas from which carbon dioxide is removed, and that is capable of controlling and maintaining the inner pressure and temperature thereof,
wherein, in the reactor, the combustion exhausted gas containing carbon dioxide is brought into contact with water, to precipitate carbon dioxide hydrate, and thereby carbon dioxide contained in the combustion exhausted gas is separated and recovered.

7. The apparatus for separation and recovery of carbon dioxide from a combustion exhausted gas as claimed in claim 6, which comprises:
(A) the reactor having the inlet of the combustion exhausted gas, the outlet of the combustion exhausted gas from which carbon dioxide is removed, and means for spraying water in a form of fine particles inside the reactor;
(B) means for supplying the combustion exhausted gas, which for pressurizes the combustion exhausted gas by compression and supplies the pressurized combustion exhausted gas to the reactor;
(C) means for controlling temperature, which controls and maintains the combustion exhausted gas inside the reactor at a temperature to form carbon dioxide hydrate; and
(D) means for supplying water, which pressurizes water and supplies the pressurized water to the means for spraying water.

8. The apparatus for separation and recovery of carbon dioxide from a combustion exhausted gas as claimed in claim 6, which comprises:
(A) the reactor having the inlet of the combustion exhausted gas, the outlet of the combustion exhausted gas from which carbon dioxide is removed, and a carrier provided in the reactor for carrying water therein;
(B) means for supplying the combustion exhausted gas, which pressurizes the combustion exhausted gas by compression and supplies the pressurized combustion exhausted gas to the reactor; and
(C) means for controlling temperature, which controls and maintains the combustion exhausted gas inside the reactor at a temperature to form carbon dioxide hydrate.

9. The apparatus for separation and recovery of carbon dioxide from a combustion exhausted gas as claimed in claim 6, wherein the water contains a water-soluble organic compound.

* * * * *